United States Patent
Yao et al.

(10) Patent No.: US 11,419,056 B2
(45) Date of Patent: Aug. 16, 2022

(54) POWER CONTROL METHOD AND DEVICE, AND COMMUNICATION NODE

(71) Applicant: ZTE CORPORATION, Guangdong (CN)

(72) Inventors: Ke Yao, Guangdong (CN); Bo Gao, Guangdong (CN); Yu Ngok Li, Guangdong (CN); Zhaohua Lu, Guangdong (CN)

(73) Assignee: ZTE CORPORATION

( * ) Notice: Subject to any disclaimer, the term of this patent is extended or adjusted under 35 U.S.C. 154(b) by 20 days.

(21) Appl. No.: 16/976,122

(22) PCT Filed: Feb. 25, 2019

(86) PCT No.: PCT/CN2019/076002
§ 371 (c)(1),
(2) Date: Aug. 27, 2020

(87) PCT Pub. No.: WO2019/165942
PCT Pub. Date: Sep. 6, 2019

(65) Prior Publication Data
US 2020/0413345 A1    Dec. 31, 2020

(30) Foreign Application Priority Data

Feb. 27, 2018  (CN) .......................... 201810165201.5

(51) Int. Cl.
*H04W 52/08*  (2009.01)
*H04L 5/00*  (2006.01)
(Continued)

(52) U.S. Cl.
CPC .......... *H04W 52/08* (2013.01); *H04L 5/0048* (2013.01); *H04L 41/0806* (2013.01);
(Continued)

(58) Field of Classification Search
CPC ............... H04W 52/36; H04W 72/042; H04W 52/08; H04W 52/54; H04W 52/32; H04W 72/04;
(Continued)

(56) References Cited

U.S. PATENT DOCUMENTS 8,767,605 B2 * 7/2014 Lin .................... H04W 52/0222
370/389
9,538,476 B2 * 1/2017 Wang .................. H04W 52/146
(Continued)

FOREIGN PATENT DOCUMENTS

CN     102474835 A     5/2012
CN     103369654 A     10/2013
(Continued)

OTHER PUBLICATIONS

Patent Cooperation Treaty (PCT), International Search Report and Written Opinion for Application PCT/CN2019/076002 filed on Feb. 25, 2019, dated May 30, 2019, International Searching Authority, CN.
(Continued)

*Primary Examiner* — Man U Phan
(74) *Attorney, Agent, or Firm* — McDonald Hopkins LLC

(57) ABSTRACT

Disclosed is a power control method. The method includes: receiving downlink control information (DCI), where the DCI carries a transmit power control (TPC) command; determining a closed loop power control index of the TPC command in the DCI; and updating a closed loop power control part corresponding to the closed loop power control index in transmit power of a first communication node according to the TPC command. Also disclosed are a power control device, a first communication node, a second communication node, and a computer storage medium.

11 Claims, 2 Drawing Sheets

(51) Int. Cl.
*H04L 41/0806* (2022.01)
*H04W 52/32* (2009.01)
*H04W 52/36* (2009.01)
*H04W 72/04* (2009.01)

(52) U.S. Cl.
CPC ............ *H04W 52/32* (2013.01); *H04W 52/36* (2013.01); *H04W 72/042* (2013.01)

(58) Field of Classification Search
CPC ..... H04L 41/0806; H04L 5/0048; H04L 5/00; H04L 12/24
USPC .......................................................... 370/254
See application file for complete search history.

(56) References Cited

U.S. PATENT DOCUMENTS

| | | | | |
|---|---|---|---|---|
| 9,554,340 | B2* | 1/2017 | Sorrentino | H04W 52/325 |
| 10,425,900 | B2* | 9/2019 | Liu | H04W 72/042 |
| 10,512,072 | B2* | 12/2019 | Yi | H04L 5/0053 |
| 10,568,041 | B2* | 2/2020 | MolavianJazi | H04W 52/367 |
| 10,856,237 | B2* | 12/2020 | Xu | H04W 52/42 |
| 10,880,838 | B2* | 12/2020 | Chen | H04W 52/146 |
| 10,887,842 | B2* | 1/2021 | Fu | H04W 80/08 |
| 10,996,191 | B2* | 5/2021 | Okamoto | G01N 27/4071 |
| 11,005,613 | B2* | 5/2021 | Chen | H04W 56/0005 |
| 11,102,771 | B2* | 8/2021 | Yi | H04J 11/00 |
| 2014/0204919 | A1 | 7/2014 | Chen et al. | |
| 2015/0201382 | A1 | 7/2015 | Want et al. | |
| 2016/0227486 | A1 | 8/2016 | Park | |
| 2020/0288404 | A1* | 9/2020 | Nory | H04W 52/146 |

FOREIGN PATENT DOCUMENTS

| | | |
|---|---|---|
| CN | 103379605 | 10/2013 |
| CN | 103517392 A | 1/2014 |
| CN | 104039000 | 9/2014 |
| CN | 104812040 | 7/2015 |
| CN | 108135028 | 6/2018 |
| WO | 2015042881 | 4/2015 |

OTHER PUBLICATIONS

R1-1718655, "Further etails on closed loop power control," 3GPP TSG RAN WG1 Meeting 90bis. (Oct. 2017).

Chinese Office Action dated Aug. 4, 2021; Chinese Patent Application No. 201810165201.5 filed on Feb. 27, 2018.

First Search Report; Chinese Patent Application No. 201810165201.5 filed on Feb. 27, 2018.

Ericsson, "Remaining issues of closed loop power control in NR," 3GPP TSG RAN WG1 Meeting 91, R1-1721031, Reno, USA, 2017.

"Technical Specification Group Radio Access Network; Physical layer procedures for control," 3GPP TS 38.213, 2018.

Extended European Search Report for Application 19760044.8, PCT/CN/2019076002, dated Oct. 22, 2021, 11 pgs., European Patent Office, Germany.

Notification of Office Action for Application No. 3,092,282 in the Canadian Patent Office Action, dated Oct. 13, 2021.

* cited by examiner

POWER CONTROL METHOD AND DEVICE, AND COMMUNICATION NODE

CROSS-REFERENCE TO RELATED APPLICATION

The present application is a 35 U.S.C. 371 national stage filing of PCT Application No. PCT/CN2019/076002, filed on Feb. 25, 2019, which claims the priority of Chinese patent application No. 201810165201.5 filed on Feb. 27, 2018, disclosure of which are incorporated herein by reference in their entireties.

TECHNICAL FIELD

The present disclosure relates to the field of virtual reality technologies and, for example, to a power control method and device, and a communication node.

BACKGROUND

Currently, the new radio (NR) technology is under development. As the fifth generation mobile communication system, this technology is required to support an unprecedented number of different types of application scenarios, and also required to support conventional frequency bands, new high-frequency bands and beam manners. The above requirements present significant challenges to the design of power control.

The power control in the long term evolution (LTE) relates to many factors, such as path loss (PL), target received power, maximum transmit power, an amount of closed loop power adjustment, transmission bandwidth, transmission rate, etc. In a multi-beam scenario of the NR technology, parts of parameters of the power control relate to beam or transmitted beam pair link (BPL).

In the related art, a command which supports multiple closed loop power control loops and performs power adjustment on each loop is called the Transmit Power Control Command (TPC Command). When the TPC command is issued in group in Downlink Control Information (DCI), the unclear indication of the closed-loop power control loops may occurs.

SUMMARY

The present disclosure provides a power control method and device for solving the problem of unclear indication of the closed loop power control.

The embodiments of the present disclosure provide a power control method. The method is applied to a first communication node, and includes the following steps.

DCI is received. The DCI carries a TPC command.

A closed loop power control index of the TPC command in the DCI is determined.

A closed loop power control part corresponding to the closed loop power control index in transmit power of the first communication node is updated according to the TPC command.

The embodiments of the present disclosure provide a power control method. The method is applied to a second communication node, and includes the following steps.

At least one grouped DCI type is preset for a first communication node. The grouped DCI type is used for determining a transmission manner of sending a TPC command in a grouping manner.

DCI is sent to the first communication node according to the grouped DCI type. The DCI carries the TPC command. The TPC command is used for determining a closed loop power control part to be updated in transmit power of the first communication node.

The embodiments of the present disclosure provide a power control device. The device is applied to a first communication node, and includes a receiving unit, a determining unit and an updating unit.

The receiving unit is configured to receive DCI. The DCI carries a TPC command.

The determining unit is configured to determine a closed loop power control index of the TPC command in the DCI received by the receiving unit.

The updating unit is configured to update a closed loop power control part corresponding to the closed loop power control index determined by the determining unit in transmit power of the first communication node according to the TPC command.

The embodiments of the present disclosure provide a power control device. The device is applied to a second communication node, and includes a setting unit and a sending unit.

The setting unit is configured to preset at least one grouped DCI type for a first communication node. The grouped DCI type is used for determining a transmission manner of sending a TPC command in a grouping manner.

The sending unit is configured to send DCI to the first communication node according to the grouped DCI type. The DCI carries the TPC command. The TPC command is used for a closed loop power control part to be updated in transmit power of the first communication node.

The embodiments of the present disclosure provide a first communication node. The first communication node includes a processor and a memory coupled to the processor. The memory is configured to store a program executable on the processor and capable of maintaining normal communication of a client. The program capable of maintaining the normal communication of the client, when executed by the processor, implements the method described in any one of embodiments described above.

The embodiments of the present disclosure provide a computer storage medium, which is configured to store a program capable of maintaining normal communication of a client. The program capable of maintaining the normal communication of the client, when executed by a processor, implements the method described in any one of embodiments described above.

The embodiments of the present disclosure provide a second communication node. The second communication node includes a processor and a memory coupled to the processor. The memory is configured to store a program executable on the processor and capable of maintaining normal communication of a client. The program capable of maintaining the normal communication of the client, when executed by the processor, implements the method described in any one of embodiments described above.

The embodiments of the present disclosure provide a computer storage medium, which is configured to store a program capable of maintaining normal communication of a client. The program capable of maintaining the normal communication of the client, when executed by a processor, implements the method described in any one of embodiments described above.

DETAILED DESCRIPTION

Figure 1:
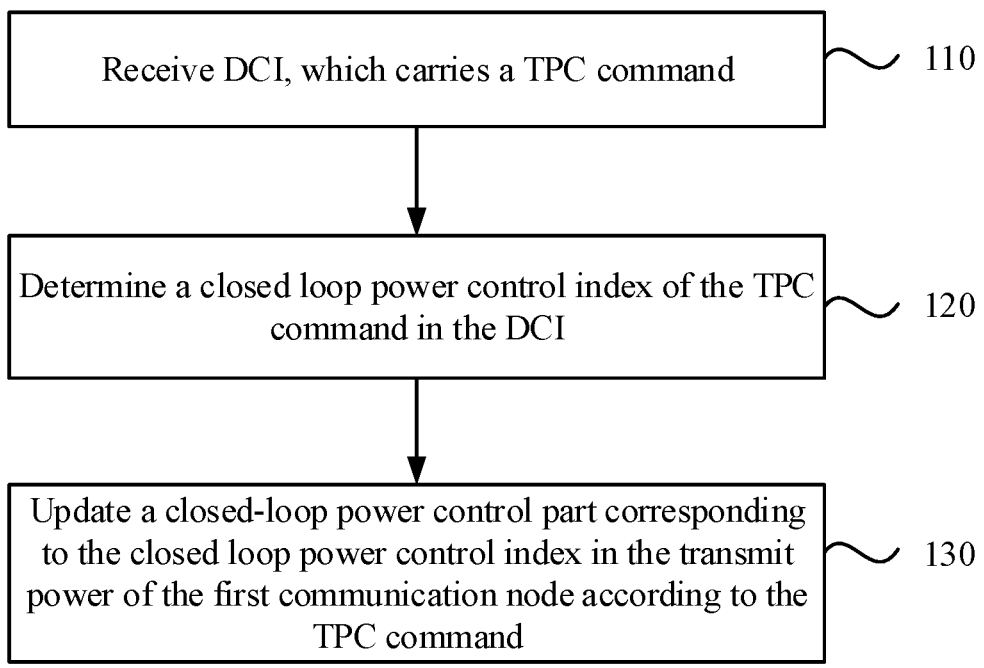
FIG. 1 is a flowchart of a power control method provided by the embodiments of the present disclosure.

In a radio communication system, in order to reduce power consumption of a sending device and reduce interference caused by unnecessary high-power transmission to other transmission, performing the transmit power control on transmission is needed. The transmit power is affected by various factors, such as the size of a communication range, maximum transmit power and receive sensitivities of transceiving devices of both communication parties, a modulation and coding scheme and rate of data, a working frequency band, a bandwidth occupied by transmission, etc. Generally, lower transmit power should be used as far as possible under the condition that received signal quality requirements at a receive end are satisfied.

In the general communication technology, a communication node 1 sends a reference signal, and a communication node 2 measures a pathloss (PL) from the node 1 to the node 2 according to the reference signal. The PL is calculated by a difference between the transmit power of the reference signal of the node 1 and a receiving power of a reference signal received by the node 2. It is assumed that the PL of a transmission channel from the node 2 to the node 1 is the same as the PL of a channel from the node 1 to the node 2, and then the node 2 may use the above PL to calculate the transmit power of transmission from the node 2 to the node 1 where the node 2 serves as a sending node. Since the PL is a result of unilateral measurement, this factor belongs to the open loop part in the transmit power. The node 1 receives the transmission and then performs analyzing, and provides the node 2 with information on power adjustment according to the reception quality. This process belongs to the closed loop power control.

In LTE, a link from a base station to a terminal is referred to as a downlink, and a link from the terminal to the base station is referred to as an uplink. The power of the downlink is determined by the base station according to a channel measurement result of each of multiple scheduled user equipments (UEs) and a scheduling algorithm. The power control of the uplink is a manner of the combination of the open loop and the closed loop. In addition, the power may also be affected by specific quantities related to the transmission, such as a sending rate, a modulation and coding scheme (MCS) level, and sending bandwidth.

The following is a calculation formula for calculating the transmit power of the physical uplink shared channel (PUSCH) of LTE. This will be used as an example to describe parameters that affect the transmit power.

$$P_{PUSCH,c}(i) = \min \begin{cases} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{cases}$$

In the above formula, the subscript c refers to a cell, and each component carrier (CC) supporting a carrier aggregation (CA) function corresponds to one cell. It can be seen from the above formula that each parameter in the power calculation formula is configured or calculated for each cell. All descriptions herein are described for one CC, and no specific reference to a cell is made. In an embodiment, all parameters herein can be extended to multiple CCs as long as the configured and calculated parameters which are related to the power are configured independently for each CC.

In the above formula, the open loop part of the power $P_{PUSCH}$ of uplink transmission for the PUSCH is determined by target received power $P_{O\_PUSCH}$, a pathloss amount PL and a pathloss factor $\alpha$. The target received power is classified into a cell-level parameter and a UE-level parameter, and are determined by the base station and configured for the UE. For a closed loop part of the power $P_{PUSCH}$ of uplink transmission for the PUSCH, a closed loop power control adjustment amount is determined by the base station according to a difference between the measurement result and the target. The closed loop power control adjustment amount is used to TPC command transmission, which is, informing the UE in a manner of $\delta_{PUSCH}$ as for PUSCH in the DCI. The UE maintains a local power adjustment amount $f(i)$, and updates the local power adjustment amount according to the TPC command (also called sending power control command). The purpose of closed loop power control is achieved by adopting the above formula. In the formula, i refers to a subframe index, $\Delta_{TF}$ refers to a MCS-related power offset, and $P_{CMAX}$ refers to a maximum power limit of the UE.

In an embodiment, in LTE, there are a cell-level target received power P0_nominal for a PUSCH (semi-static, dynamic, Message3 (Msg3)) and a cell-level target received power P0_nominal for a physical uplink control channel (PUCCH), and respectively correspond to different Block Error Ratio (BLER) requirements. The parameters for UE-level target received power P0_UE_specific are also set for the above items respectively, and are used to compensate a systematic deviation, such as a PL estimation error and an absolute output power set error.

In the actual application, $f(i)$ may be updated according to the transmit power control command in two manners: an accumulated manner and an absolute value manner. The absolute value manner refers to updating a local closed loop power adjustment amount $f(i)$ of the UE directly according to the transmit power control command sent by the base station. The accumulated manner refers to determining the local closed loop power adjustment amount $f(i)$ of the UE according to both the transmit power control command sent by the base station and historical values of the local closed loop power adjustment amount of the UE.

$f(i)$ mentioned above represents the local closed loop power adjustment amount of the UE, which is also called the closed loop power control part.

Beam transmission is introduced by the 5th Generation mobile communication technology (5G), and both the base station and the UE support multi-beam. In a beam operating mode, the calculation of the power needs to take beam characteristics into consideration. The present disclosure provides a power control method for a multi-beam mode. Each parameter mentioned in the present disclosure is applicable to different channels, such as PUSCHs, long PUSCHs, short PUSCHs, PUCCHs, long PUCCHs, short PUCCHs and Sounding Reference Signals (SRSs). When parameters of a same type are applied to each of the above channels or signals, the parameters may be configured independently or configured in a combinational way. Being configured in a combinational way refers to that different channels or signals may share the same value, and channels or signals that may share the same value are determined in a predefined manner or configured by the base station.

In NR, more than one closed loop power control may be supported, and each closed loop power control corresponds to one closed loop power control process. The base station independently sends a TPC command for each closed loop power control, and updates the closed loop power adjustment amount of the corresponding closed loop power control.

For convenience of description, in the embodiments of the present application, a base station and an UE are described as examples, which are not intended to limit the present application.

During the implementation of the present disclosure, the base station and the UE may be replaced by various communication nodes such as NodeB (NB) in the 3rd Generation mobile communication technology, NodeB (gNB) in 5G, transmitter receiver point (TRP), access point (AP), site, user, station (STA), relay, and terminal.

Embodiment One

The closed loop power control is used for uplink transmission, that is, the UE performs the transmission, and the base station receives the transmission and sends a power adjustment command to the UE according to the quality of received transmission and channel measurement conditions for subsequent transmit power calculation of uplink transmission. The power adjustment command is also called transmit power control command, closed loop transmit power control command, or TPC command.

In practice, processes of multiple closed loop power controls may be maintained between base station and the UE, and such a process is also called the closed loop power control loop, closed loop power control for short. The closed loop power control is identified by a closed loop power control index. Each closed loop power control independently performs closed loop power control adjustment, i.e., one TPC command is used for one closed loop power control.

In addition, multiple closed loop power controls may be used for supporting different scheduling manners separately, such as grant based transmission, grant free transmission, semi-persistent scheduling transmission (SPS), uplink-transmission without grant-type1 (UL-TWG-type1) transmission, uplink-transmission without grant-type2 (UL-TWG-type2), etc.

The multiple closed loop power controls may also be used for supporting transmission related to different transceiving beam pair links (BPLs) or different beams (or beam groups) separately. The beam and the BPL can be indicated through reference signals. Therefore, the multiple closed loop power controls may support transmission related to different reference signals separately.

For example, PUSCH transmission related to a first reference signal corresponds to a closed loop power control index 1, and PUSCH transmission related to a second reference signal corresponds to a closed loop power control index 2, that is, two difference PUSCH transmissions correspond to different closed loop power controls.

The transmission related to the reference signal refers to transmission in which a reference signal is used as a reference to a transmission or reception manner, or that downlink control information including transmission grant information includes a reference signal indication or a reference signal resource indication.

The multiple closed loop power controls may also be used for supporting different service types separately, such as enhanced Mobile BroadBand (eMBB), Ultra-Reliable Low Latency Connection (URLLC) and massive Machine Type of Communication (mMTC).

In an embodiment, the base station may send a closed loop power control command in a unicast form, that is, one piece of downlink control information includes only the TPC command sent to one UE. For example, the base station sends grant information of uplink transmission in the downlink control information to the UE for scheduling the uplink transmission, where the grant information includes scheduling information of transmission. The downlink control information carries a closed loop control command for adjusting the transmit power of the corresponding uplink transmission (e.g., PUSCH). Alternatively, the base station sends grant information of downlink transmission in the downlink control information to the UE for scheduling the downlink transmission, where the grant information includes scheduling information of transmission. The downlink control information carries a closed loop control command for adjusting transmit power used by an uplink feedback channel (e.g., PUCCH) corresponding to the downlink transmission.

The base station may send the closed loop power control command in a multicast form, where the multicast form is also called the packet mode, that is, one piece of downlink control information may include TPC commands sent to multiple UEs. There are several following types of TPC commands that are sent in the multicast form in the downlink control information in NR:

DCI 2-2: grouped TPC commands for PUCCH and PUSCH, where different Radio Network Temporary Identifiers (RNTIs) are used for scrambling to distinguish whether the TPC command is for PUCCH transmission or for PUSCH transmission.

DCI 2-3: grouped TPC commands for SRS transmissions.

The downlink control information of the grouped TPC command is used not only for PUSCH of SPS, but also for dynamically scheduled PUSCH. The PUSCH of SPS and the dynamically scheduled PUSCH may be configured as independent closed loop power control, and correspond to closed loop power control with different index. Therefore, the TPC command in DCI 2-2 may be used for different closed loop power controls respectively, and the closed loop power control index corresponding to the TPC command in DCI 2-2 should be clearly specified.

The downlink control information of the grouped TPC command may also be used for supporting a plurality of beams or beam groups, and each one of the plurality of beams or beam groups correspond to a respective one of different closed loop power controls. When there are TPC commands for all beams (or beam groups) in the downlink control information, closed loop power control indexes do not need to be explicitly indicated in the downlink control information. When there are TPC commands of only part of beams (or beam groups) in the downlink control information, closed loop power control indexes should be explicitly indicated in the downlink control information. Alternatively, in a case where closed loop power control indexes are not indicated in the downlink control information, the correspondence between a TPC and a closed-loop power control is obtained through high-level configuration information and/or other configuration information related to closed-loop power control.

In the downlink control information, the TPC commands supporting part of closed-loop power controls can effectively utilize DCI resources, where frequencies of sending TPC commands for different closed-loop power controls are controlled independently. Compared with the TPC command supporting all closed loop power controls, the TPC commands supporting part of closed loop power controls can utilize resources more effectively. In addition, the TPC commands supporting part of closed loop power controls in the downlink control information can also shorten the length of DCI and improve demodulation reliability.

When DCI 2-2 is used for PUCCH, there are also dynamically triggered PUCCH transmission and semi-static PUCCH transmission. Therefore, DCI 2-2 can also support multi-beam (or multi-beam group), and thus there will also be multiple closed loop power controls for PUCCH.

In other words, for a UE, the downlink control information of the grouped TPC command may include all supported closed loop power control TPC commands, or may include only part of supported closed loop power control TPC commands. When the downlink control information of the grouped TPC command includes only part of supported closed loop power control TPC commands, the base station should specify to the UE a TPC command is used to which closed loop power control(s).

The closed loop power control described herein includes a closed loop power control of the PUSCH, closed loop power control of the PUCCH, and closed loop power control of the SRS, which are used for PUSCH transmission, PUCCH transmission and SRS transmission respectively.

Embodiment Two

With reference to FIG. 1, this embodiment provides a power control method. The method is applied to a first communication node, and includes steps 110 to 130.

In step 110, DCI is received. The DCI carries a TPC command.

In step 120, a closed loop power control index of the TPC command in the DCI is determined.

In step 130, a closed loop power control part corresponding to the closed loop power control index in transmit power of the first communication node is updated according to the TPC command.

In an embodiment, the closed loop power control part refers to an adjustment value of a closed loop power control identified by the corresponding closed loop power control index, such as $f(i)$ in the power control formula. Each closed loop power control corresponds to a different $f(i)$. When the closed loop power control index is l, $f(i)$ may be represented as $f_l(i)$. In i is an index of a time domain, such as a slot index. The base station sends TPC commands independently for each closed loop power control index, and the TPC command is used for updating $f_l(i)$ of the corresponding closed loop power control index.

In an embodiment, the step that the closed loop power control index of the TPC command in the DCI is determined includes the step described below.

The closed loop power control index of the TPC command in the DCI is determined according to closed loop power control index information carried in the DCI.

In an embodiment, the step that the closed loop power control index of the TPC command in the DCI is determined includes the step described below.

The closed loop power control index of the TPC command in the DCI is determined according to related information of the DCI and a first association relationship, where the first association relationship is an association relationship between the related information of the DCI and the closed loop power control index.

In an embodiment, before the closed loop power control index of the TPC command in the DCI is determined, the method further includes a step described below.

A grouped DCI type of the DCI is determined according to a preset grouped DCI type detection manner.

In the actual application, the grouped DCI type detection manner may be determined through at least one of the following:

a DCI format identification information domain;
a DCI format type index;
reference signal configuration information of the DCI;
time domain information of the DCI;
frequency domain information of the DCI; or
code domain information of the DCI.

In an embodiment, the step that the closed loop power control index of the TPC command in the DCI is determined includes one of the following steps.

The closed loop power control index of the TPC command in the DCI is determined according to the grouped DCI type of the DCI.

The closed loop power control index of the TPC command in the DCI is determined according to the grouped DCI type of the DCI and the closed loop power control index information carried in the DCI.

The closed loop power control index of the TPC command in the DCI is determined according to the grouped DCI type of the DCI, related information of the DCI and the first association relationship, where the first association relationship is an association relationship between the related information of the DCI and the closed loop power control index.

In an embodiment, the step that the closed loop power control index of the TPC command in the DCI is determined includes the steps described below.

An offset of the grouped DCI type is acquired.
A starting position of the TPC command in the grouped DCI type is determined according to the offset of the grouped DCI type.

In an embodiment, the step that the closed loop power control index of the TPC command in the DCI is determined includes the steps described below.

First closed loop power control index related information of the grouped DCI type is acquired.

First channel information and a quantity of closed loop power controls of each channel in the first channel information and/or a closed loop power control index of each channel in the first channel information are acquired.

The quantity of TPC commands in the grouped DCI type is determined according to the first closed loop power control index related information and the quantity of closed loop power controls of each channel in the first channel information and/or the closed loop power control index of each channel in the first channel information.

The first channel information includes at least one of: configured or activated carrier information, configured or activated serving cell information, or configured or activated bandwidth part information.

The first closed loop power control index related information includes at least one of: a specified closed loop power control index, or a specified quantity of closed loop power control indexes.

In an embodiment, the related information of the DCI includes at least one of the following:
frequency domain position information of the DCI;
time domain position information of the DCI;
code domain position information of the DCI;
demodulation reference signal (DMRS) format information of the DCI;
format identifier information of the DCI;
grant type information of DCI-related transmission;
service type information of the DCI-related transmission; or
scrambling information of the DCI.

By adopting the above technical solution, the problem of unclear indication of closed loop power control can be solved.

Embodiment Three

Figure 2:
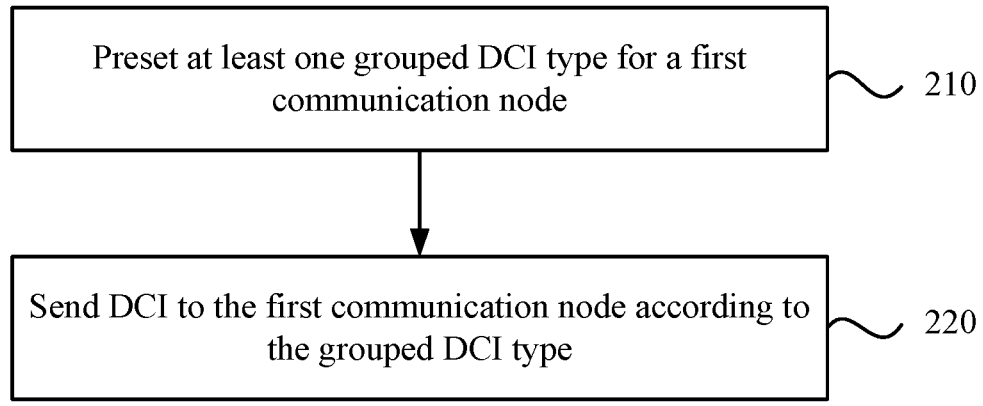
FIG. 2 is a flowchart of another power control method provided by the embodiments of the present disclosure.

With reference to FIG. 2, this embodiment provides another power control method. The method is applied to a second communication node, and includes steps 210 and 220.

In step 210, at least one grouped DCI type is preset for a first communication node, where the grouped DCI type is used for determining a transmission manner of sending a TPC command in a grouping manner.

The at least one grouped DCI type is preset by at least one of the following: using a signaling-configured manner, or not using a signaling-predefined manner.

The transmission includes at least one of the following: scrambling information for the DCI; a position of the TPC command of the first communication node in the DCI, such as an offset; the quantity of TPC commands of the first communication node in the DCI; a carrier/serving cell/BandWidth Part (BWP) corresponding to each TPC command of the first communication node; or the closed loop power control index.

In step 220, the DCI is sent to the first communication node according to the grouped DCI type, where the DCI carries the TPC command, where the TPC command is used for determining a closed loop power control part to be updated in transmit power of the first communication node.

In an embodiment, before the DCI is sent to the first communication node according to the grouped DCI type, the method further includes the step described below.

First closed loop power control index related information is configured or predefined for each of the grouped DCI types, where the first closed loop power control index related information is used for determining a closed loop power control associated with the TPC command.

The step that the DCI is sent to the first communication node according to the grouped DCI type includes: sending the DCI to the first communication node according to the grouped DCI type and the first closed loop power control index related information.

Exemplarily, the first closed loop power control index related information includes at least one of the following:
a specified closed loop power control index, or a specified quantity of closed loop power control indexes.

Exemplarily, the method further includes: configuring first channel information for the first communication node, where the first channel information includes at least one of the following:
configured or activated carrier information;
configured or activated serving cell information; or
configured or activated bandwidth part (BWP) information.

Exemplarily, the method further includes: configuring a quantity of closed loop power controls or a closed loop power control index of the first channel information for the first communication node by at least one of the following manners:
configuring a quantity of closed loop power controls of the carrier information or a closed loop power control index of the carrier information;
configuring a quantity of closed loop power controls of the serving cell information or a closed loop power control index of the serving cell information; or
configuring a quantity of closed loop power controls of the bandwidth part information or a closed loop power control index of the bandwidth part information.

Exemplarily, in a case where the first closed loop power control index related information includes the specified closed loop power control index, the DCI includes a TPC command of the specified closed loop power control index on the first channel information of the first communication node.

Exemplarily, in a case where the first closed loop power control index related information includes the specified closed loop power control index and the specified closed loop power control index is not configured on the first channel information of the first communication node, the DCI does not include the TPC command of the first channel information of the first communication node.

The specified closed loop power control index is specified by at least one of: specifying all closed loop power control indexes, or specifying part of closed loop power control indexes.

The specified part of closed loop power control indexes includes at least one of:
a closed loop power control index, a closed loop power control index group number, or second closed loop power control index related information.

The second closed loop power control index related information includes at least one of: grant type information, or service type information.

Exemplarily, the method further includes: preconfiguring an association relationship between the second closed loop power control index related information and the closed loop power control index.

In an embodiment, in a case where the first closed loop power control index related information includes the specified quantity of closed loop power control indexes, the DCI includes a TPC command of the specified quantity of closed loop power control indexes on the first channel information of the first communication node.

In an embodiment, the specified quantity of closed loop power control indexes is specified by at least one of:
specifying all closed loop power control indexes, or specifying the quantity of configured closed loop power control indexes.

In an embodiment, in a case where a quantity of closed loop power control indexes configured on the first channel information of the first communication node is less than or equal to the quantity of configured closed loop power control indexes, the DCI includes a TPC command of the quantity of closed loop power control indexes configured on the first channel information of the first communication node.

In an embodiment, in a case where the quantity of closed loop power control indexes configured on the first channel information of the first communication node is greater than the quantity of configured closed loop power control indexes, the method further includes at least one of the following steps.

Closed loop power control index information carried in the DCI is configured.

Related information of the DCI and a first association relationship are configured, where the first association relationship is an association relationship between the related information of the DCI and the closed loop power control index.

In an embodiment, the related information of the DCI includes at least one of the following:
  grant type information of DCI-related transmission;
  service type information of the DCI-related transmission;
  DCI format identification domain information of the DCI;
  scrambling information of the DCI;
  DMRS configuration information of the DCI;
  time domain resource configuration information of the DCI;
  frequency domain resource configuration information of the DCI; or
  code domain resource configuration information of the DCI.

In an embodiment, the method further includes the step described below.

A detection manner of the grouped DCI type is configured for the first communication node, where the grouped DCI type is determined through the detection manner according to first detection information, where the first detection information includes at least one of:
  a DCI format identification information domain;
  a DCI format type index;
  reference signal configuration information of the DCI;
  time domain information of the DCI;
  frequency domain information of the DCI; or
  code domain information of the DCI.

By adopting the above technical solution, the problem of unclear indication of closed loop power control can be solved.

Embodiment Four

The present disclosure provides a closed loop power control method. The method includes the step described below.

A base station sends downlink control information to the UE, where the downlink control information includes a transmit power control (TPC) command.

This embodiment of the present disclosure is described with the first communication node as the UE and the second communication node as the base station.

The TPC command is a general term of one or more transmit power control commands. The TPC command is used for calculating transmit power of transmission. In one embodiment, the TPC command is used in the closed loop power control part in the transmit power control calculation. The TPC command may also include indication information related to the closed loop power control index.

The base station configures or activates carriers/serving cells/BWPs and a quantity of closed loop power controls or closed loop power control index of each carrier/serving cell/BWP for the UE.

Each UE may be configured with more than one carrier, such as normal carriers and supplementary uplink carriers (SULs).

Each carrier may support more than one serving cell, also known as a component carrier.

Each serving cell may be configured with more than one BWP.

The quantity of closed loop power controls may be configured at BWP level, or may be configured at serving cell level or carrier level. The carriers, serving cells and BWPs are not all configured, and a certain level may be not configured. Therefore, "closed loop power control of the carrier/serving cell/BWP" herein is used to indicate one of the following concepts: closed loop power control of a carrier or a serving cell or a BWP, closed loop power control of a certain BWP of a certain serving cell of a certain carrier, closed loop power control of a certain BWP of a certain carrier, closed loop power control of a certain BWP of a certain serving cell, and closed loop power control of a certain serving cell of a certain carrier.

The carrier/serving cell/BWP configured for the UE may be activated or not, and if the carrier, serving cell or BWP is activated, the base station sends to the UE a TPC command on the closed loop power control of the carrier/serving cell/BWP; or the base station sends to the UE the TPC command on the closed loop power control of the carrier/serving cell/BWP as long as the carrier/serving cell/BWP is configured, regardless of whether the carrier/serving cell/BWP is activated or not.

The base station enables the UE to acquire a correspondence between the TPC command and the closed loop power control index in at least one of the following manners.

1. The downlink control information includes uplink grant/scheduling information for indicating a transmission manner of PUSCH transmission, and the TPC command is used for updating a power adjustment amount of the closed loop power control corresponding to the PUSCH transmission.

2. The downlink control information includes downlink grant/scheduling information for indicating a transmission manner of physical downlink shared channel (PDSCH) transmission, and the TPC command is used for updating a power adjustment amount of the closed loop power control of a PUCCH corresponding to the PDSCH transmission.

3. The downlink control information includes TPC signaling of at least one UE, and the TPC signaling of each UE includes at least one TPC command. The quantity of TPC commands per UE is related to the carrier/serving cell/BWP configured for the UE and the quantity of closed loop power controls of the carrier/serving cell/BWP configured for the UE.

1) The TPC signaling of each UE includes the maximum number of TPC commands calculated according to the carrier/serving cell/BWP and the quantity of closed loop power controls thereof.

The BWP is configured on the serving cells, and each serving cell may be configured with one or more BWPs. One or more BWPs may be activated at the same time. In a case where BWPs are configured, the quantity of closed loop power controls can be configured on each BWP, and the quantity of TPC commands of each serving cell is the sum of the quantity of closed loop power controls of each of all configured/activated BWPs of the serving cell. In a case where no BWP is further configured on the serving cell, the quantity of closed loop power controls is configured on each serving cell. In a case where one carrier is supported, the maximum number of TPC commands that the TPC signaling of each UE may include is the sum of the quantity of TPC commands of all configured/activated serving cells. In a case where the configuration of multiple carriers is supported and TPC commands of the multiple carriers are carried in one downlink control information, the maximum number of TPC commands that can be included in the TPC signaling of each UE is the sum of the quantity of TPC commands of all serving cells in all configured/activated carriers.

For example, in a case where one carrier is configured, the quantity of serving cells configured in an active state for the UE is 2. The quantity of closed loop power controls in a first serving cell is 2, the quantity of closed loop power controls in a second serving cell is 1, and the TPC signaling of the UE includes at most the sum of the quantity of closed loop power controls of all serving cells, that is, 3 TPC commands. Each piece of downlink control information sent to the UE includes 3 TPC commands of the UE.

In another example, in a case where the quantity of serving cells configured in an active state for the UE is 1, the quantity of configured/activated BWPs in this serving cell is 2. The quantity of closed loop power controls in a first BWP is 2, the quantity of closed loop power controls in a second BWP is 1, and the TPC signaling of the UE includes at most the sum of the quantity of closed loop power controls on all configured/activated BWPs in all serving cells in the active state, that is, 3 TPC commands. Each piece of downlink control information sent to the UE includes 3 TPC commands of the UE.

For each UE, the TPC commands of multiple carriers may be arranged in order of identities (IDs) of the carriers, e.g., from small to large, or in order of frequencies of the carriers, e.g., from low to high.

The TPC commands of multiple serving cells within one carrier are arranged in order of IDs of serving cell, e.g., from small to large. The TPC commands of multiple BWPs of one serving cell are arranged in order of IDs of the BWPs, e.g., from small to large, or may be arranged according to the frequency domains of the BWPs, e.g., from low frequency domain to high frequency domain. The TPC commands corresponding to multiple closed loop power control indexes of one carrier/serving cell/BWP are arranged in the order of the closed loop power control indexes, e.g., from small numbers to large numbers.

Therefore, after the configured/activated carriers/serving cells/BWPs of a certain UE and the quantity of configured closed loop power controls thereof are determined, the quantity of TPC commands of the UE in one piece of downlink control information is determined, and the carrier/serving cell/BWP and the closed loop power control index corresponding to each TPC command are also determined.

2) The TPC signaling for each UE in one piece of downlink control information only includes TPC commands of part of closed loop power control indexes. At least one of the following cases occurs.

a. The TPC signaling for each UE in one piece of downlink control information only includes TPC commands of each carrier/serving cell/BWP with the specified closed loop power control index. All TPC commands of all UEs in the downlink control information correspond to the same closed loop power control index.

For example, in a case where the quantity of serving cells configured in an active state for the UE is 2, the quantity of closed loop power controls in a first serving cell is 2, where closed loop power control indexes corresponding to the two closed loop power controls are l=0 and l=1, and the quantity of closed loop power controls in a second serving cell is 1, where the closed loop power control index corresponding to the one closed loop power control is l=0. The TPC signaling of the UE thus includes at most 3 TPC commands. In one piece of downlink control information (hereinafter referred to as downlink control information 0), TPC commands corresponding to serving cells with l=0 are included, which are used for an adjustment amount of closed loop power control corresponding to the closed loop power control index l=0 of a serving cell 1 and an adjustment amount of closed loop power control corresponding to the closed loop power control index l=0 of a serving cell 2, that is, two TPC commands are included. In another piece of downlink control information (hereinafter referred to as downlink control information 1), TPC command corresponding to serving cells with l=1 is included, which is used for an adjustment amount of closed loop power control corresponding to the closed loop power control index l=1 of the serving cell 1, that is, the TPC signaling of the UE includes only 1 TPC command since the serving cell 2 does not have the closed loop power control index l=1. In another piece of downlink control information (hereinafter referred to as downlink control information 1), TPC commands corresponding to serving cells with l=1 are included, which are used for the adjustment amount of closed loop power control corresponding to the closed loop power control index l=1 of the serving cell 1. Although, in this case, the serving cell 2 does not have the closed loop power control index l=1, the TPC signaling of the UE includes 2 TPC commands, where the TPC command of the serving cell 2 is reserved.

b. The TPC signaling for each UE in one piece of downlink control information includes TPC commands of each carrier/serving cell/BWP with the specified closed loop power control index. All TPC commands of each UE in the downlink control information correspond to the same closed loop power control index. That is, the TPC commands of different UEs in the same downlink control information correspond to independently configured or indicated closed loop power control indexes respectively, that is, different UEs may correspond to different closed loop power control indexes.

c. The TPC signaling for each UE in one piece of downlink control information includes TPC commands of each carrier/serving cell/BWP with the specified closed loop power control index. Each TPC command of each UE in the downlink control information corresponds to the independently configured or specified closed loop power control index. That is, different TPC commands of the same UE in the same downlink control information may correspond to different closed loop power control indexes.

The closed loop power control index corresponding to each TPC command in the downlink control information is determined in at least one of the following manners.

(1) The downlink control information includes indication information of the closed loop power control index.

The indication information of the closed loop power control index includes at least one of: a closed loop power control index, or a closed loop power control index combination identifier.

The downlink control information only includes one closed loop power control index or one closed loop power control index combination, and corresponds to TPC commands of all UEs in the downlink control information.

For example, the downlink control information 0 includes indication information of the closed loop power control index l=0; and the downlink control information 1 and the downlink control information 2 include the indication information of the closed loop power control index l=1.

For example, one BWP is configured with 4 closed loop power control which are identified as l=0, l=1, l=2 and l=3, where l=0 and l=1 are the combination 1 which is identified as combination ID1, and l=2 and l=3 are the combination 2 which is identified as combination ID2. In a case where the TPC command indicated in the downlink control information is for the combination 1, i.e., adjustment for closed loop power control of l=0 and l=1. In this case, the downlink control information carries combination ID1.

In an embodiment, the downlink control information includes one or more than one closed loop power control index or closed loop power control index combination corresponding to TPC commands of different UEs in the downlink control information respectively. That is, each UE is independently configured with one closed loop power control index or closed loop power control index combination.

For the UE that does not support multiple closed loop power controls, or the UE that does not separately send TPC commands of multiple closed loop power controls, or in the case that the closed loop power control indexes corresponding to TPC commands corresponding to the same downlink control information format are not unclear, the closed loop power control index or the closed loop power control index combination for this UE is not sent in the downlink control information.

In an embodiment, the downlink control information includes one or more than one closed loop power control index or closed loop power control index combination corresponding to different TPC commands of different UEs in the downlink control information. That is, each TPC command is configured with a closed loop power control index or a closed loop power control index combination.

For the UE that does not support multiple closed loop power controls, or the UE that does not separately send TPC commands of multiple closed loop power controls, or in the case that the closed loop power control indexes corresponding to TPC commands corresponding to the same downlink control information format are not unclear, the closed loop power control index or the closed loop power control index combination for this TPC command is not sent in the downlink control information.

(2) The downlink control information includes a grant type for indicating the closed loop power control index.

The grant type in the downlink control information is used for indicating the closed loop power control index. In a case where the quantity of grant types included in the DCI is 1, the grant type is for TPC commands of all UEs in the DCI. Alternatively, one grant type may be indicated for each UE, or for each carrier/serving cell/BWP of each UE.

For example, the grant type includes at least one of: grant based, grant free, UL-TWG-type1, or UL-TWG-type2, etc. The downlink control information includes one of the above grant types, and the included grant type is directly or indirectly associated with the closed loop power control index. All TPC commands in the downlink control information are used for power adjustment of transmission of the included grant type, and the corresponding closed loop power control index is also determined. Since the closed loop power control index is independently configured for each CC/BWP, TPC commands of each CC/BWP of each UE may correspond to different closed loop power control indexes.

(3) The downlink control information includes a service type for indicating the closed loop power control index.

The service type in the downlink control information is used for indicating the closed loop power control index. In a case where the quantity of service types included in the DCI is 1, the service type indicates closed loop power control indexes of TPC commands of all UEs in the DCI. Alternatively, one service type may be indicated for each UE, or for each carrier/serving cell/BWP of each UE.

For example, the service type includes at least one of: eMBB, URLLC, or other services. The downlink control information includes one of the above service types, and the included service type is directly or indirectly associated with the closed loop power control index. All TPC commands in the downlink control information are used for power adjustment of transmission of the included service type, and the corresponding closed loop power control index is also determined. Since the closed loop power control index is independently configured for each CC/BWP, TPC commands of each CC/BWP of each UE may correspond to different closed loop power control indexes.

(4) The DCI format identification domain in the downlink control information is used for indicating the closed loop power control index.

The DCI format identification domain in the downlink control information is used for indicating the closed loop power control index, and corresponds to TPC commands of all UEs in the downlink control information.

For example, the DCI format identification domain is used for identifying a specific DCI format from several different DCI formats with a same length. In a case where the quantity of bits of this domain is greater than or equal to 1, a combination of some bits may be used for identifying the closed loop power control index. It is assumed that DCI 2-2 is downlink control information carrying TPC signaling of one or more UEs, and has the same length as DCI 2-1 and DCI 2-3. The DCI format identification domain has 2 bits, where 0b00 denotes DCI 2-1, 0b01 denotes DCI 2-3, 0b10 denotes DCI 2-2 with the closed loop power control index l=0, and 0b11 denotes DCI 2-2 with the closed loop power control index l=1.

(5) The scramble sequence of the downlink control information is used for indicating the closed loop power control index.

The scramble sequence of the downlink control information is used for indicating the closed loop power control index, and corresponds to TPC commands of all UEs in the downlink control information.

For example, the base station configures multiple RNTIs for the UE, where the multiple RNTIs correspond to closed loop power control indexes of different PUSCHs. The base station configures multiple additional RNTIs for the UE, where the multiple additional RNTIs correspond to closed loop power control indexes of different PUCCHs.

(6) The DMRS configuration of the downlink control information is used for indicating the closed loop power control index.

The DMRS configuration of the downlink control information is used for indicating the closed loop power control index, and corresponds to TPC commands of all UEs in the downlink control information.

For example, the base station indicates multiple different DMRS configurations for the UE to distinguish different closed loop power control indexes. Different DMRS configurations include at least one of: different sequences of the DMRS, different shifts of the same sequence of the DMRS, or different time domain and/or frequency domain positions of the DMRS.

(7) The time domain resource configuration of the downlink control information is used for indicating the closed loop power control index.

The time domain resource configuration of the downlink control information is used for indicating the closed loop power control index, and corresponds to TPC commands of all UEs in the downlink control information.

For example, the base station indicates multiple different time domain resource configurations of the downlink control information for the UE to distinguish different closed loop power control indexes. The time domain resource configurations include a time domain starting point and/or a time domain offset.

In another example, the time domain resources where the DCI transmission is located are pre-divided into X sets, and each set of the X sets is predefined or configured by the base station to correspond to a closed loop power control or a closed loop power control combination. In a case where the downlink control information is located within the time domain of an x-th set of time domain, the TPC command in the downlink control information is used for indicating the closed loop power control or the closed loop power control combination corresponding to the x-th set of time domain, where X is an integer greater than or equal to 0, and x is an integer from 1 to X.

(8) The frequency domain resource configuration of the downlink control information is used for indicating the closed loop power control index.

The frequency domain resource configuration of the downlink control information is used for indicating the closed loop power control index, and corresponds to TPC commands of all UEs in the downlink control information.

For example, the base station indicates multiple different frequency domain resource configurations of the downlink control information for the UE to distinguish different closed loop power control indexes. The frequency domain resource configurations include an index of a control resource set (CORESET), frequency domain spacing configuration, etc.

(9) The code domain resource configuration of the downlink control information is used for indicating the closed loop power control index.

The code domain resource configuration of the downlink control information is used for indicating the closed loop power control index, and corresponds to TPC commands of all UEs in the downlink control information.

For example, the base station indicates multiple different code domain resource configurations of the downlink control information for the UE to distinguish different closed loop power control indexes.

One or more manners of above (1) to (9) are determined to be used through pre-configuration of the base station or are predefined to be used.

The base station preconfigures an association relationship between one or more pieces of information in (2) to (9) and information of closed loop power control index. The UE acquires closed loop power control indexes corresponding to TPC commands of the downlink control information according to information in (2) to (9).

(10) High-layer signaling such as radio resource control (RRC) signaling and/or a media access control control element (MAC CE) may also be used by the base station to configure a relationship between the grouped downlink control information and the closed loop power control index. At least one of the following manners is included.

If the format type of the grouped downlink control information of the TPC commands configured for the UE or determined in a predefined manner is a single format type and is a downlink control information format type that sends the maximum number of closed loop power controls, there is no need to additionally configure the relationship of the high layer signaling. The quantity of TPC commands and corresponding closed loop power control indexes thereof may be determined according to the carriers/serving cells/BWPs and the quantity of the closed loop power controls of each carrier/serving cell/BWP.

If the format type of the grouped downlink control information of the TPC commands configured for the UE or determined in a predefined manner is a single format type and is a downlink control information format type that sends part of closed loop power controls, the high layer signaling is also require to indicate the closed loop power control indexes of the TPC commands. One of the following manners is included: the high-layer signaling directly or indirectly indicates the closed loop power control index for the UE and is used for determining closed loop power control indexes corresponding to all TPC commands of the UE; or the high-layer signaling directly or indirectly indicates the closed loop power control index of each carrier/serving cell/BWP for the UE and is used for determining the closed loop power control of the carrier/serving cell/BWP corresponding to the UE.

If the format type of the grouped downlink control information of the TPC commands configured for the UE or determined in a predefined manner is more than one format type, each format type directly or indirectly indicates closed loop power control indexes of all carriers/serving cells/BWPs of the UE, or each format type directly or indirectly indicates the closed loop power control index of each carrier/serving cell/BWP of the UE.

Indirectly indicating the closed loop power control index refers to that the high-layer signaling indicates the closed loop power control index through other information other than the closed loop power control index. The other information is called information related to the closed loop power control index such as the grant type and/or service type. The closed loop power control is determined according to an association relationship between the preconfigured information related to the closed loop power control index and the closed loop power control index.

The single format type refers to one fixed format type. That is, in a case where the grouped TPC command is carried in the downlink control information (e.g., DCI format 2-2, i.e., DCI 2-2), for each UE, each TPC command has corresponding information of a certain carrier/serving cell/BWP/closed loop power control index. The closed loop power control index may be configured/activated full closed loop power controls of the UE on a corresponding serving cell/carrier/BWP, or may be part of the closed loop power control. Since there is only one type, in a case where part of the closed loop power control is supported, the closed loop power control index or the closed loop power control index group is preconfigured by the base station, or determined in a predefined manner.

More than one format type refers to that when the grouped TPC command is carried in the downlink control information (e.g., DCI format 2-2), there may be different combinations of TPC commands for a certain UE. That is, for a certain UE, different grouped TPC commands have different meanings in the TPC command combinations included in the downlink control information type. If the numbers of TPC commands in different TPC command combination manners are the same, the TPC commands at the same position in the TPC command combinations correspond to the same carrier/serving cell/BWP, or may correspond to different closed loop power control indexes. If the numbers of TPC commands in different TPC command combination manners are different, TPCs in different TPC command combinations have corresponding information of the independent carrier/serving cell/BWP. The base station configures the identification mode of each format for the UE. The identification manner may be distinguished by related information of the downlink control information in (1) to (9). The base station preconfigures the relationship between the related information of the downlink control information and the identification mode of each format. The UE may identify the format type of the downlink control information according to the related information of the downlink control information.

For example, type 1 is a combination of TPC commands with closed-loop power control index 1 for all carriers/serving cells/BWPs, and type 2 is a combination of TPC commands with closed-loop power control index 2 for all carriers/serving cells/BWPs. The quantity of TPC commands in type 2 is different from the quantity of TPC commands in type 1. These two types are distinguished by different RNTI mentioned above.

In a case where one fixed format type is used to send TPC commands, the quantity and length of TPC commands included in each piece of downlink control information are fixed. The base station configures a TPC command offset position for the UE to support TPC signaling starting positions of different UEs when multiple UEs multiplex downlink control information.

In a case where more than one format type is used to send TPC commands, the quantity and length of TPC commands included in each piece of downlink control information are fixed. In a case where part of carriers/serving cells/BWPs does not send TPC commands, corresponding positions of the part of carriers/serving cells/BWPs are also reserved.

Alternatively, in the case where more than one type is used to send TPC commands, the quantity of TPC commands included in each piece of downlink control information is not fixed. For example, it can be predicted that, the length of the downlink control information 0 is different from the length of the downlink control information 1, where the difference in length is caused by the different quantity of closed loop power controls on different carriers/serving cells/BWPs. Both the base station and the UE can infer the length of downlink control information 0 and the length of the downlink control information 1 according to the configuration of the closed loop control quantity of the carrier/serving cell/BWP to parse the corresponding transmit power control signaling.

In a case where one fixed type is used to send TPC commands, the base station configures a TPC command offset position for the UE to support TPC signaling starting positions of different UEs when multiple UEs multiplex downlink control information.

In a case where more than one type is used to send TPC commands, the base station configures at least one TPC command offset position for the UEs to support different TPC command combination schemes respectively when multiple UEs multiplex downlink control information.

In a case where a carrier, a serving cell and a BWP are configured for a certain UE, TPC commands are arranged according to the order of the carrier, the serving cell and the BWP.

TPC commands of multiple carriers are arranged in ascending order of frequency domains of carriers.

TPC commands of multiple serving cells within a carrier are arranged in order of IDs of serving cell, e.g., from small to large.

TPC commands of multiple BWPs of one serving cell are arranged in order of IDs of the BWPs, e.g., from small to large, or in order of the frequency domains of BWPs, e.g., from low frequency domain to high frequency domain.

TPC commands corresponding to multiple closed loop power control indexes of one serving cell or BWP are arranged in order of closed loop power control indexes, e.g., from small numbers to large numbers.

Therefore, after configured/activated carriers, serving cells, BWPs on each serving cell, the quantity of closed loop power controls of each carrier/serving cell/BWP, and format types of TPC commands of multiple closed loop power controls of the corresponding carrier/serving cell/BWP of a certain UE are determined, in a case where the format type is a single format type, the quantity of TPC commands in one piece of downlink control information of the UE and the closed loop power control index corresponding to the serving cell and/or BWP corresponding to each TPC command can also be determined; and in a case where the format type is more than one format type, a combination of TPC commands of the carrier/serving cell/BWP may be determined according to the high-layer information and the downlink control information.

Generally, the closed loop power control index starts from 0. If each UE is unified to have one closed loop power control index in each piece of downlink control information, the length of the downlink control information may be greatly different. For example, the TPC signaling with closed loop power control index 0 is long because each configured/activated carrier/serving cell/BWP has its own TPC command(s), while the TPC signaling with closed loop power control index 1 is short. Therefore, in the case where the TPC signaling of multiple UEs is sent in one downlink control information, the closed loop power control indexes of different UEs may be different. For example, the downlink control information 0 includes all TPC commands with l=0 of UE 1, and also includes all TPC commands with l=1 of UE 2. The downlink control information 1 includes all TPC commands with l=1 of UE 2, and also includes all TPC commands with l=0 of UE 1.

Embodiment Five

The present disclosure provides a closed loop power control method. The method includes the steps described below.

From the perspective of the signaling of UE, the method includes at least one of the following.

The UE receives downlink control information (DCI) sent by the base station, wherein the DCI carries the TPC command.

The UE determines a closed loop power control index of the TPC command in the DCI.

A power control adjustment amount of closed loop power control corresponding to the TPC command is updated.

The information of the closed loop power control index is determined according to at least one of the following manners.

The information of the closed loop power control index is indicated in downlink control information sent by the base station, where the downlink control information includes the transmit power control command.

The information of the closed loop power control index is determined according to related information of downlink control information carrying the transmit power control command.

The information of the closed loop power control index may also be independently determined by high-layer signaling, or determined by both the high-layer signaling and a physical layer signal.

In a case where the base station configures for the UE or determines in a predefined manner a closed loop power control index corresponding to the TPC command carried in the DCI, the DCI does not explicitly or implicitly indicate the closed loop power control index.

In a case where the base station configures for the UE, or determines in a predefined manner an association relationship between the DCI transmission manner and the closed loop power control index, the DCI does not carry the closed loop power control index. For example, when the DCI transmission manner refers to a slot index set, different slot index sets correspond to different grouped DCI types, respectively. For example, in a case where the quantity of slot index sets is 2, the time domain information of the DCI is divided into two sets, i.e., a set of odd slot index and a set of even slot index, which correspond to two grouped DCI types respectively. DCI sent in odd slot index corresponds to a first grouped DCI type, and DCI sent in even slot index corresponds to a second grouped DCI type.

The base station configures at least one grouped DCI type to the UE by high-layer signaling or predefines at least one grouped DCI type for the UE, also called as a DCI format type of grouped TPC commands. For example, for DCI 2-2, the TPC signaling for transmitting closed control power control of PUSCH may have at least one type. Different detection manners are configured to each grouped DCI type.

The UE determines a grouped DCI type of the received DCI according to a preset grouped DCI type detection manner so as to determine characteristics corresponding to the DCI format type. For example, the offset is used for indicating a starting position of the TPC command of the UE in the DCI, DCI scrambling information such as RNTI configuration, the quantity of closed loop power control or a closed loop power control index, etc.

Different grouped DCI type detection manners may be related to the time domain information of the DCI. For example, the detection manner refers to that in a case where different values of the time domain information of the DCI are used to distinguish different grouped DCI types, the base station configures different time domain information for sending the DCI for different grouped DCI types of the UE. The time domain information of the DCI may be at least one of: sub-frame index set, frame index set, slot index set, symbol index set, or time domain unit index set for a future system. In a case where the time domain information of the DCI refers to slot index set, different slot index set respectively correspond to different grouped DCI types. For example, when the quantity of slot index set is 2, the time domain information of the DCI is divided into two sets, i.e., a set of odd slot index and a set of even slot index, which correspond to two grouped DCI types respectively. DCI sent in odd slot index corresponds to a first grouped DCI type, and DCI sent in even slot index corresponds to a second grouped DCI type.

The detection manner may also be other manners, and for detail, reference is made to description about the detection manner of the grouped DCI type in Embodiment four.

In a case where the closed loop power control index corresponding to the TPC command cannot be determined according to the high-layer signaling, the physical layer signal and the DCI explicitly or implicitly indicate the closed loop power control index of the TPC command. The closed loop power control index may be carried directly by the DCI or be indicated in other manners. For details, reference is made to (1) to (9) in Embodiment two.

In an embodiment, the related information of downlink control information carrying the transmit power control command includes at least one of the following.

(1) The downlink control information includes indication information of a closed loop power control index.

(2) The downlink control information includes a grant type for indicating a closed loop power control index.

(3) The downlink control information includes a service type for indicating a closed loop power control index.

(4) The downlink control information includes a DCI format identification domain for indicating a closed loop power control index.

(5) The downlink control information includes a scramble sequence for indicating a closed loop power control index.

(6) The downlink control information includes a DMRS configuration for indicating a closed loop power control index.

(7) The downlink control information includes a time domain resource configuration for indicating a closed loop power control index.

(8) The downlink control information includes a frequency domain resource configuration for indicating a closed loop power control index.

(9) The downlink control information includes a code domain resource configuration for indicating a closed loop power control index.

The base station preconfigures the association relationship between the related information of downlink control information carrying the transmit power control command and the information of the closed loop power control index.

The base station configures an optional set of indication for closed loop power control index, and indication information of closed loop power control index refers to indicating one element from the optional set.

The optional set is configured to the BWP level, CC level or UE level.

Embodiment Six

The base station configures or activates a carrier/serving cell/BWP and configures a quantity of closed loop power control of each carrier/serving cell/BWP for the UE or a closed loop power control index of each carrier/serving cell/BWP for the UE.

The base station configures for the UE or determines in a predefined manner at least one DCI format type of grouped TPC commands.

The DCI format type of TPC commands send in a grouped manner may also be called grouped DCI format type or grouped DCI type. The grouped DCI type may be a DCI format type of grouped TPC commands for one of the following transmissions: PUSCH, PUCCH and SRS.

For each DCI format type of grouped TPC commands, the offset of the TPC signaling of the UE in the DCI is configured.

For each DCI format type of grouped TPC commands, closed loop power control index related information I is configured or determined in a predefined manner in a case where the UE sends the TPC signaling in the DCI. The closed loop power control index related information I includes at least one of: a specified closed loop power control index (or a specified closed loop power control index group), or a specified quantity of closed loop power control indexes (or a specified quantity of closed loop power control index groups).

1. In a case that the closed loop power control index related information I is the "specified closed loop power control index (or specified closed loop power control index group group)", the DCI includes the TPC command of the closed loop power control index specified on the carrier/serving cell/BWP configured or activated for the UE.

If no specified closed loop power control index is configured for the carrier/serving cell/BWP of the UE, there is no TPC command for the carrier/serving cell/BWP, and the bit number occupied in the DCI is zero.

The specified closed loop power control index is specified by at least one of: all closed loop power control indexes, or part of closed loop power control indexes.

All closed loop power control indexes refer to all closed loop power control indexes configured on each carrier/serving cell/BWP, where no closed loop power control index is particularly specified, that is, the DCI includes TPC commands of all closed loop power control indexes on the carrier/serving cell/BWP configured or activated for the UE.

If part of closed loop power control indexes can be configured for the UE, part of closed loop power control indexes are valid for each carrier/serving cell/BWP of the UE, and closed loop power control indexes can be configured for each carrier/serving cell/BWP of the UE respectively.

The part of closed loop power control indexes refer to at least one of: a closed loop power control index, a closed loop power control index group number, or closed loop power control index related information II. The closed loop power control index may include at least one closed loop power control index. The closed loop power control index related information II includes at least one of: grant type, or service type. In a case where the closed loop power control index related information II is used, the base station preconfigures or predefines an association relationship between grant information II and the closed loop power control index. The closed loop power control index group number refers to that all closed loop power control indexes are pre-divided into multiple groups, and the closed loop power control index group number can be used to determine a corresponding closed loop power control index.

The DCI does not carry the information of the closed loop power control index. The quantity of TPC signaling of the UE may be used to determine the length of the TPC signaling.

2. In a case that the closed loop power control index related information I is the "specified quantity of closed loop power control indexes (or specified quantity of closed loop power control index groups)", the DCI includes TPC commands of the specified quantity of closed loop power control indexes on the carrier/serving cell/BWP configured or activated for the UE.

The specified quantity of closed loop power control indexes is specified by at least one of: all closed loop power control indexes, or a specified quantity of configured closed loop power control indexes.

All closed loop power control indexes refer to all closed loop power control indexes configured on each carrier/serving cell/BWP, where no closed loop power control index is particularly specified, that is, the DCI includes TPC commands of all closed loop power control indexes on the carrier/serving cell/BWP configured or activated for the UE. The DCI does not carry the information of the closed loop power control index. The quantity of TPC signaling of the UE may be used to determine the length of the TPC signaling.

If the specified number of closed loop power control indexes can be configured for the UE, the specified number of closed loop power control indexes is valid for each carrier/serving cell/BWP of the UE, and the quantity of closed loop power control indexes can be configured for each carrier/serving cell/BWP of the UE respectively.

If the quantity of closed loop power control indexes configured on a certain carrier/serving cell/BWP of the UE is less than or equal to the specified quantity of closed loop power control indexes, only TPC commands of the configured quantity of closed loop power control indexes are sent on the carrier/serving cell/BWP of the UE. The DCI does not carry or indicate closed loop power control indexes of TPC commands on this carrier/serving cell/BWP of the UE.

If the quantity of closed loop power control indexes configured on a certain carrier/serving cell/BWP of the UE is greater than the specified quantity of closed loop power control indexes, closed loop power control indexes corresponding to TPC commands on this carrier/serving cell/BWP in the DCI are determined in at least one of the following manners.

(1) The downlink control information includes indication information of a closed loop power control index.

(2) The downlink control information includes a grant type for indicating a closed loop power control index.

(3) The downlink control information includes a service type for indicating a closed loop power control index.

(4) The downlink control information includes a DCI format identification domain for indicating a closed loop power control index.

(5) The downlink control information includes a scramble sequence for indicating a closed loop power control index.

(6) The downlink control information includes a DMRS configuration for indicating a closed loop power control index.

(7) The downlink control information includes a time domain resource configuration for indicating a closed loop power control index.

(8) The downlink control information includes a frequency domain resource configuration for indicating a closed loop power control index.

(9) The downlink control information includes a code domain resource configuration for indicating a closed loop power control index.

For details, reference is made to the related description in (1) to (9) in Embodiment two.

In a case where the manners in (1) to (3) are adopted, the closed loop power control index or the related information is carried in the DCI. In a case where n the manners in (4) to (9) are adopted, the information of the closed loop power control index is determined by the association relationship preconfigured by the base station between the information in (4) to (9) and the closed loop power control index.

The quantity of TPC commands in the DCI of the UE and the closed loop power control index corresponding to each TPC command may be determined according to the carrier/serving cell/BWP configuration of the UE, the quantity of closed loop power control indexes configured on the carrier/serving cell/BWP of each UE, and the "specified closed loop power control index (group)" or the "specified quantity of closed loop power control indexes (groups)".

The base station configures for the UE a detection manner of each DCI format type for grouped TPC commands, and different DCI format types for grouped TPC commands are distinguished by different values in at least one of the following information: scrambling information of the DCI, a DCI format identification information domain, a DCI format type index, configuration information reference signal (RS) of the DCI, time domain information of the DCI, frequency domain information of the DCI, or code domain information of the DCI.

In a case where the above detection manner refers to distinguishing different grouped DCI types by different values of the scrambling information of the DCI, the base station configures different RNTIs for different grouped DCI types of the UE respectively. Each of the configured RNTIs is used for scrambling DCI information of a respective one of the DCI format types.

In a case where the above detection manner refers to distinguishing different grouped DCI types by different values of the time domain information of the DCI, the base station configures different time domain information for sending the DCI for different grouped DCI types of the UE respectively. The time domain information of the DCI may be at least one of: a sub-frame index set, a frame index set, a slot index set, a symbol index set, or a time domain unit index set for a future system. In a case where the time domain information of the DCI refers to slot index set, different slot index set respectively correspond to different grouped DCI types. For example, when the quantity of slot index set is 2, the time domain information of the DCI is divided into two sets, i.e., a set of odd slot index and a set of even slot index, which correspond to two grouped DCI types respectively. DCI sent in odd slot index corresponds to a first grouped DCI type, and DCI sent in even slot index corresponds to a second grouped DCI type.

In a case where the above detection manner refers to distinguishing different grouped DCI types by different values of the frequency domain information of the DCI, the base station configures different frequency domain information for sending the DCI for different grouped DCI types of the UE respectively. The frequency domain information of the DCI includes at least one of: an index of a CORESET, or frequency domain spacing configuration.

In a case where the above detection manner refers to distinguishing different grouped DCI types by different values of the code domain information of the DCI, the base station configures different code domain information for sending the DCI for different grouped DCI types of the UE respectively.

In a case where the above detection manner refers to distinguishing different grouped DCI types by different values of the DCI format type indexes, the base station configures different DCI format type indexes for different grouped DCI types of the UE respectively, where each of the different DCI format type indexes is carried in the DCI information of a respective one of the DCI format types.

In a case where the above detection manner refers to distinguishing different grouped DCI types by different values of the DCI format identification information domain, the base station configures different values of different DCI format identification information domains for different grouped DCI types of the UE respectively, where each of the DCI format identification information domain is carried in the DCI information of a respective one of the DCI format types.

The order of multiple TPC commands of carriers/serving cells/BWPs/closed loop power control indexes of the same UE in the DCI is arranged as follows.

For each UE, the TPC commands of multiple carriers may be arranged in order of IDs of the carriers, e.g., from small to large, or in order of frequencies of the carriers, e.g., from low to high.

The TPC commands of multiple serving cells within one carrier are arranged in order of IDs of serving cells, e.g., from small to large.

The TPC commands of multiple BWPs of one serving cell are arranged in order of IDs of the BWPs, e.g., from small to large, or in order of the frequency domains of the BWPs, e.g., from low frequency domain to high frequency domain.

The TPC commands corresponding to multiple closed loop power control indexes of one carrier/serving cell/BWP are arranged in the order of the closed loop power control indexes, e.g., from small to large.

Each closed loop power control corresponds to one TPC command, therefore after the configured/activated carriers/serving cell of a certain UE, configured/activated BWPs on each serving cell, and the quantity of closed loop power controls configured on each carrier/serving cell/BWP are determined, the quantity of TPC commands corresponding to each carrier/serving cell/BWP and the closed loop power control indexes corresponding to the TPC commands can be determined.

The UE determines the DCI format type for sending grouped TPC commands according to the DCI detection manner. The starting position of the TPC command in the DCI format type for sending grouped TPC commands by a UE, the quantity of TPC commands and the closed loop power control index of the carrier/serving cell/BWP corresponding to each TPC command can be determined according to the offset of the format type of DCI, the "closed loop power control index related information I", the "configured/activated carriers/serving cells/BWPs of the UE, and the quantity of the closed loop power controls or closed loop power control indexes of each carrier/serving cell/BWP".

The method disclosed by the present disclosure can be used for implementing the following solutions for indicating the closed loop power control index corresponding to the TPC command in the grouped DCI.

Solution 1

The base station configures for the UE first channel information, which includes configured or activated carriers/serving cells/BWPs.

The base station configures a closed loop power control index corresponding to the first channel information for the UE, where the closed loop power control index includes closed loop power control indexes of the carriers and/or serving cells and/or BWPs or the quantity of the closed loop power controls of the carriers and/or serving cells and/or BWPs. A set of closed loop power control indexes can be determined according to the quantity of the closed loop power controls. For example, when the quantity of the closed loop power controls is 2, the corresponding closed loop power control indexes are {0, 1}.

The base station configures the offset of the TPC command in the grouped DCI for the UE.

The base station sends the DCI for the UE, where the DCI includes TPC commands corresponding to all closed loop power control indexes configured on all configured or activated carriers/serving cells/BWPs of the UE.

In the solution 1, TPC commands should be sent for all closed loop power control indexes, which is greatly overhead, and since TPC commands corresponding to different closed loop power control indexes may have different updating frequencies, it is unnecessary to bind the TPC commands together for sending. Therefore, the following improvement solutions are proposed.

Solution 2

The base station configures for the UE first channel information, which includes configured or activated carriers/serving cells/BWPs.

The base station configures a closed loop power control index corresponding to the first channel information for the UE, where the closed loop power control index includes closed loop power control indexes of the carriers and/or serving cells and/or BWPs or the quantity of the closed loop power controls of the carriers and/or serving cells and/or BWPs. The base station configures the offset of the TPC command in the grouped DCI for the UE.

The base station sends the DCI for the UE, where the DCI includes TPC commands corresponding to all or part of closed loop power control indexes configured on all configured or activated carriers/serving cells/BWPs of the UE.

The all or part of closed loop power control indexes are indicated by at least one of: specifying a closed loop power control index, or specifying the quantity of closed loop power control indexes.

In a case of specifying the closed loop power control index, the grouped DCI does not implicitly indicate or explicitly carry the closed loop power control index. In a case of specifying the quantity of the closed loop power control indexes, the grouped DCI implicitly or explicitly carry the closed loop power control index.

For the implicitly carrying the information of the closed loop power control index, reference is made to description of (2) to (9) in embodiments described above.

For example, the predefined grouped DCI, e.g., DCI type 2-2, is for the grant free type (UL-TWG-type1 and UL-TWG-type2), and the UE-based DCI is for the grant based type.

Solution 3

The base station configures for the UE first channel information, which includes configured or activated carriers/serving cells/BWPs.

The base station configures a closed loop power control index corresponding to the first channel information for the UE, where the closed loop power control index includes closed loop power control indexes of the carriers and/or serving cells and/or BWPs or the quantity of the closed loop power controls of the carriers and/or serving cells and/or BWPs. The base station configures one or more offsets of the TPC command in the grouped DCI for the UE, where the one or more offsets correspond to one or more grouped DCI types respectively.

The base station sends the DCI for the UE, where the DCI includes TPC commands corresponding to all or part of closed loop power control indexes configured on all configured or activated carriers/serving cells/BWPs of the UE.

The closed loop power control index of the TPC command carried in the DCI is determined according to the time domain information sent by the DCI, e.g., the slot index. The relationship between the slot index and the closed loop power control index is configured to the UE by the base station or is predefined. For example, even slots carry the closed loop power control index l=0, and odd slots carry the closed loop power control index l=1.

Considering the expansion of the quantity of closed loop power control indexes, the relationship between the closed loop power control index l and the slot may not simply be odd/even correspondence. A closed loop power control index l may have correspondence with a predefined slot index set.

For the slot with l=1, only if carriers/serving cells/BWPs with l greater than 1 are configured, it is needed to send TPC commands, therefore the quantity of TPC commands of one UE with different l may be different.

For simplicity, the grouping relationship of multiple UEs is bound, and the position is reserved no matter whether the carrier/serving cell/BWP is configured with a certain closed loop power control index. In this way, the offsets of one UE are the same in all slots.

For flexibility, the offsets of the UEs in different slots are set to be different according to the quantity of the closed loop power control indexes actually configured for the carrier/serving cell/BWP. The base station configures multiple offsets by RRC signaling.

As an extension, in order to solve the problem that the quantity of TPC commands for the closed loop power control index l=0 is larger than the quantity of TPC commands for other closed loop power control indexes, DCI sent on different slots has different closed loop power control index correspondences for different UEs. Assuming that UE0 and UE1 are grouped together, for UE0, odd slot corresponds to odd l and even slot corresponds to even l; and for UE1, odd slot corresponds to even l and even slot corresponds to odd l.

As an extension for application: UE0 is grouped with UE1 in slot0, and UE0 is grouped with UE2 in slot 1. Since RRC configuration configures the offset based on the UE, different offsets can be supported as long as different slot configurations are supported.

Solution 4

RRC configures or predefines more than one grouped DCI format type, and each type has an independently configured offset and a configuration related to the closed loop power control index 1.

Types are distinguished by characteristics related to the DCI, such as scrambling of different RNTI, an identifier domain carried in the DCI, ID of the type, DMRS, and time domain information/frequency domain information/code domain information of the DCI.

For the sending of the DCI of a certain grouped DCI format type, the grouped DCI sent by the physical layer includes carriers/serving cells/BWPs (related to the sent closed loop power control index 1) and part of closed loop power control.

The manner of indicating part of closed loop power control is the same as that in the solution 2.

In a case of specifying the closed loop power control index, the grouped DCI does not implicitly or explicitly carry the closed loop power control index. In a case of specifying the quantity of closed loop power control indexes, the grouped DCI implicitly or explicitly carries the closed loop power control index.

Embodiment Seven

Figure 3:
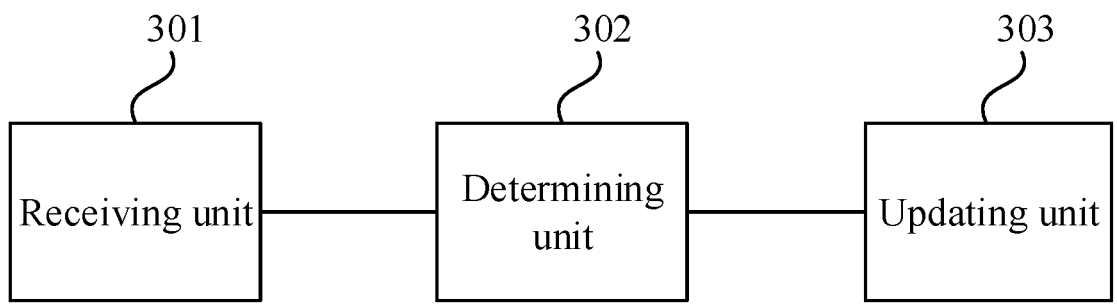
FIG. 3 is a structural diagram of a power control device provided by the embodiments of the present disclosure.

With reference to FIG. 3, the embodiments of the present disclosure provide a power control device. The device is applied to a first communication node, and includes a receiving unit 301, a determining unit 302 and an updating unit 303.

The receiving unit 301 is configured to receive DCI, where the DCI carries a TPC command.

The determining unit 302 is configured to determine a closed loop power control index of the TPC command in the DCI received by the receiving unit 301.

The updating unit 303 is configured to update a closed loop power control part corresponding to the closed loop power control index determined by the determining unit 302 in transmit power of the first communication node according to the TPC command.

In an embodiment, the determining unit 302 is configured to:
  determine the closed loop power control index of the TPC command in the DCI according to closed loop power control index information carried in the DCI.

In an embodiment, the determining unit 302 is configured to:
  determine the closed loop power control index of the TPC command in the DCI according to related information of the DCI and a first association relationship, where the first association relationship is an association relationship between the related information of the DCI and the closed loop power control index.

In an embodiment, before the closed loop power control index of the TPC command in the DCI is determined, the determining unit 302 is further configured to:
  determine a grouped DCI type of the DCI according to a preset grouped DCI type detection manner.

In an embodiment, the determining unit 302 determines the closed loop power control index of the TPC command in the DCI includes one of the following manners.

The closed loop power control index of the TPC command in the DCI is determined by the grouped DCI type of the DCI.

The closed loop power control index of the TPC command in the DCI is determined by the grouped DCI type of the DCI and the closed loop power control index information carried in the DCI.

The closed loop power control index of the TPC command in the DCI is determined by the grouped DCI type of the DCI, the related information of the DCI and the first association relationship, where the first association relationship is an association relationship between the related information of the DCI and the closed loop power control index.

In an embodiment, the determining unit 302 is configured to:
  acquire an offset of the grouped DCI type; and
  determine a starting position of the TPC command in the grouped DCI type according to the offset of the grouped DCI type.

In an embodiment, the determining unit 302 is configured to:
  acquire first closed loop power control index related information of the grouped DCI type;
  acquire first channel information and a quantity of closed loop power controls and/or a closed loop power control index of each channel in the first channel information; and
  determine the quantity of TPC commands in the grouped DCI type according to the first closed loop power control index related information and the quantity of closed loop power controls and/or the closed loop power control index of each channel in the first channel information.

The first channel information includes at least one of: configured or activated carrier information, configured or activated serving cell information, or configured or activated bandwidth part information.

The first closed loop power control index related information includes at least one of: a specified closed loop power control index, or a specified quantity of closed loop power control indexes.

In an embodiment, the related information of the DCI includes at least one of the following:
  frequency domain position information of the DCI;
  time domain position information of the DCI;
  code domain position information of the DCI;
  DMRS format information of the DCI;
  format identifier information of the DCI;
  grant type information of DCI-related transmission;
  service type information of the DCI-related transmission; or
  scrambling information of the DCI.

Embodiment Eight

Figure 4:
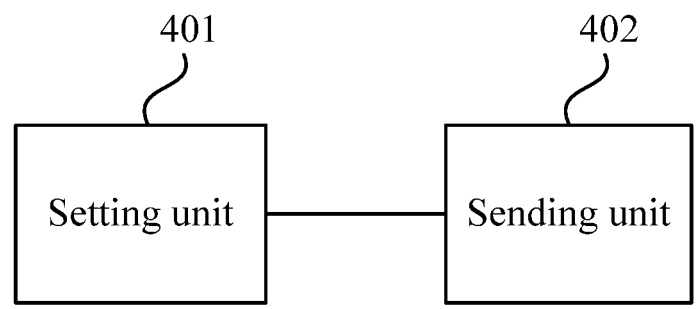
FIG. 4 is a structural diagram of another power control device provided by the embodiments of the present disclosure.

With reference to FIG. 4, the embodiments of the present application provide a power control device. The device is applied to a second communication node, and includes a setting unit 401 and a sending unit 402.

The setting unit 401 is configured to preset at least one grouped DCI type for a first communication node, where the grouped DCI type is used for determining a transmission manner of sending a TPC command in a grouping manner.

The sending unit 402 is configured to send DCI to the first communication node according to the grouped DCI type, where the DCI carries the TPC command, where the TPC command is used for determining a closed loop power control part to be updated in transmit power of the first communication node.

In an embodiment, the setting unit 401 is further configured to:
  before the sending unit 402 sends DCI to the first communication node according to the grouped DCI type, configure or predefine first closed loop power control index related information for each of the grouped DCI types, where the first closed loop power control index related information is used for determining closed loop power control associated with the TPC command.

The sending unit 402 is configured to send the DCI to the first communication node according to the grouped DCI type and the first closed loop power control index related information.

In an embodiment, the first closed loop power control index related information includes at least one of the following:
  a specified closed loop power control index, or a specified quantity of closed loop power control indexes.

In an embodiment, the setting unit 401 is further configured to configure first channel information for the first communication node, where the first channel information includes at least one of the following:
  configured or activated carrier information;
  configured or activated serving cell information; or
  configured or activated bandwidth part information.

In an embodiment, the setting unit 401 is further configured to configure a quantity of closed loop power controls or a closed loop power control index of the first channel information for the first communication node by at least one of the following manners:
  configuring a quantity of closed loop power controls of the carrier information or a closed loop power control index of the carrier information;
  configuring a quantity of closed loop power controls of the serving cell information or a closed loop power control index of the serving cell information; or
  configuring a quantity of closed loop power controls of the bandwidth part information or a closed loop power control index of the bandwidth part information.

In an embodiment, in a case where the first closed loop power control index related information is the specified closed loop power control index, the DCI includes a TPC command of the specified closed loop power control index on the first channel information of the first communication node.

In an embodiment, in a case where the first closed loop power control index related information is the specified closed loop power control index and the specified closed loop power control index is not configured on the first channel information of the first communication node, the DCI does not include the TPC command of the first channel information of the first communication node.

In an embodiment, the specified closed loop power control index is specified by at least one of: specifying all closed loop power control indexes, or specifying part of closed loop power control indexes.

In an embodiment, the specified part of closed loop power control indexes includes at least one of:
 a closed loop power control index, a closed loop power control index group number, or second closed loop power control index related information.

The second closed loop power control index related information includes at least one of: grant type information, or service type information.

In an embodiment, the setting unit 401 is further configured to:
 preconfigure an association relationship between the second closed loop power control index related information and the closed loop power control index.

In an embodiment, in a case where the first closed loop power control index related information is the specified quantity of closed loop power control indexes, the DCI includes a TPC command specifying the quantity of closed loop power control indexes on the first channel information of the first communication node.

In an embodiment, the specified quantity of closed loop power control indexes is specified by at least one of:
 specifying all closed loop power control indexes, or specifying the quantity of configured closed loop power control indexes.

In an embodiment, in a case where a quantity of closed loop power control indexes configured on the first channel information of the first communication node is less than or equal to the specified quantity of configured closed loop power control indexes, the DCI includes a TPC command of the quantity of closed loop power control indexes configured on the first channel information of the first communication node.

In an embodiment, in a case where the quantity of closed loop power control indexes configured on the first channel information of the first communication node is greater than the quantity of specified configured closed loop power control indexes, at least one of the following steps is included.

Closed loop power control index information carried in the DCI is configured.

Related information of the DCI and a first association relationship are configured, where the first association relationship is an association relationship between the related information of the DCI and the closed loop power control index.

In an embodiment, the related information of the DCI includes at least one of the following:
 grant type information of DCI-related transmission;
 service type information of the DCI-related transmission;
 DCI format identification domain information of the DCI;
 scrambling information of the DCI;
 DMRS configuration information of the DCI;
 time domain resource configuration information of the DCI;
 frequency domain resource configuration information of the DCI; or
 code domain resource configuration information of the DCI.

In an embodiment, the setting unit 401 is further configured to configure a detection manner of the grouped DCI type for the first communication node, where the grouped DCI type is determined through the detection manner according to first detection information, where the first detection information includes at least one of:
 a DCI format identification information domain;
 a DCI format type index;
 reference signal configuration information of the DCI;
 time domain information of the DCI;
 frequency domain information of the DCI; or
 code domain information of the DCI.

Embodiment Nine

Figure 5:
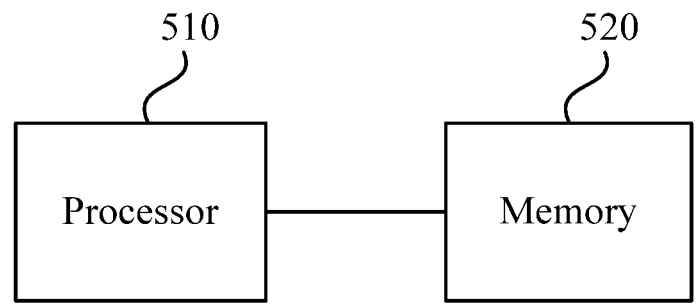
FIG. 5 is a structural diagram of a first communication node provided by the embodiments of the present disclosure.

The embodiments of the present disclosure provide a first communication node. With reference to FIG. 5, the first communication node includes a processor 510 and a memory 520 coupled to the processor 510. The memory 520 is configured to store a program executable on the processor 510 and capable of maintaining normal communication of a client. The program capable of maintaining the normal communication of the client, when executed by the processor 510, implements the method described in any one of embodiments described above.

Embodiment Ten

The embodiments of the present disclosure provide a computer storage medium, which is configured to store a program for maintaining normal communication of a client. The program for maintaining the normal communication of the client, when executed by a processor, implements the method described in any one of embodiments described above.

Embodiment Eleven

Figure 6:
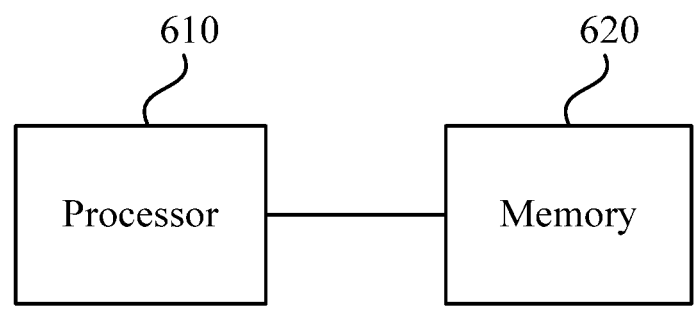
FIG. 6 is a structural diagram of a second communication node provided by the embodiments of the present disclosure.

The embodiments of the present disclosure provide a second communication node. With reference to FIG. 6, the second communication node includes a processor 610 and a memory 620 coupled to the processor 610. The memory 620 is configured to store a program executable on the processor 610 and capable of maintaining normal communication of a client. The program capable of maintaining the normal communication of the client, when executed by the processor 610, implements the method described in any one of embodiments described above.

Embodiment 12

The embodiments of the present disclosure provide a computer storage medium, which is configured to store a program for maintaining normal communication of a client. The program for maintaining the normal communication of the client, when executed by a processor, implements the method described in any one of embodiments described above.

In a practical application, the storage medium described above may be a volatile memory such as a random-access memory (RAM), may be a non-volatile memory such as a read-only memory (ROM), a flash memory, a hard disk drive (HDD) or a solid state drive (SSD), or may be a combination thereof. The storage medium described above provides instructions and data for the processor.

The processor described above may be at least one of an application specific integrated circuit (ASIC), a digital signal processor (DSP), a digital signal processing device (DSPD), a programmable logic device (PLD), a field programmable gate array (FPGA), a central processing unit (CPU), a controller, a microcontroller, or a microprocessor. It is understandable that for different equipment, the electronic device for implementing the functions of the preceding processor may be other devices, which is not specifically limited in the embodiments of the present disclosure.

It should be understood by those skilled in the art that the embodiments of the present disclosure may be provided as methods or computer program products. Therefore, the present disclosure may adopt a hardware embodiment, a software embodiment, or a combination of hardware and software embodiments. In addition, the present disclosure may adopt the form of a computer program product implemented on one or more computer-usable storage media (including, but not limited to, a disk memory, an optical memory, etc.) that include computer-usable program codes.

The present disclosure is described with reference to flowcharts and/or block diagrams of methods, devices (systems) and computer program products according to the embodiments of the present disclosure. It should be understood that computer program instructions may implement each flow and/or block in the flowcharts and/or the block diagrams and a combination of flows and/or blocks in the flowcharts and/or the block diagrams. These computer program instructions may be provided for a general-purpose computer, a special-purpose computer, an embedded processor or a processor of another programmable data processing device to produce a machine so that instructions executed by the computer or the processor of another programmable data processing device produce an device for implementing functions designated in one or more flows in the flowcharts and/or one or more blocks in the block diagrams.

These computer program instructions may be stored in a computer-readable memory that can cause the computer or another programmable data processing device to operate in a particular manner so that the instructions stored in the computer-readable memory produce a manufactured product including an instructing device. The instructing device implements the functions designated in the one or more flows in the flowcharts and/or the one or more blocks in the block diagrams.

These computer program instructions may be loaded onto the computer or another programmable data processing device so that a series of operation steps are performed on the computer or another programmable device to produce processing implemented by the computer. Therefore, instructions executed on the computer or another programmable device provide steps for implementing the functions designated in the one or more flows in the flowcharts and/or the one or more blocks in the block diagrams.

What is claimed is:

1. A power control method, applied to a first communication node, comprising:
   receiving downlink control information (DCI), wherein the DCI carries a transmit power control (TPC) command;
   determining a closed loop power control index of the TPC command in the DCI; and
   updating a closed loop power control part corresponding to the closed loop power control index in transmit power of the first communication node according to the TPC command;
   wherein before determining the closed loop power control index of the TPC command in the DCI, the method further comprises:
   determining a grouped DCI type of the DCI according to a preset grouped DCI type detection manner;
   wherein determining the closed loop power control index of the TPC command in the DCI comprises:
   acquiring first closed loop power control index related information of the grouped DCI type;
   acquiring first channel information and at least one of a quantity of closed loop power controls of each channel in the first channel information, or a closed loop power control index of each channel in the first channel information; and
   determining a number of TPC commands in the grouped DCI type according to the first closed loop power control index related information and the at least one of the quantity of closed loop power controls of each channel in the first channel information or the closed loop power control index of each channel in the first channel information;
   wherein the first channel information comprises at least one of: configured or activated carrier information, configured or activated serving cell information, or configured or activated bandwidth part information; and the first closed loop power control index related information comprises at least one of: a specified closed loop power control index, or a specified quantity of closed loop power control indexes.

2. The method according to claim 1, wherein determining the closed loop power control index of the TPC command in the DCI comprises:
   determining the closed loop power control index of the TPC command in the DCI according to closed loop power control index information carried in the DCI.

3. The method according to claim 1, wherein determining the closed loop power control index of the TPC command in the DCI comprises:
   determining the closed loop power control index of the TPC command in the DCI according to related information of the DCI and a first association relationship, wherein the first association relationship is an association relationship between the related information of the DCI and the closed loop power control index.

4. The method according to claim 1, wherein determining the closed loop power control index of the TPC command in the DCI comprises one of the following:
   determining the closed loop power control index of the TPC command in the DCI according to the grouped DCI type of the DCI;
   determining the closed loop power control index of the TPC command in the DCI according to the grouped DCI type of the DCI and closed loop power control index information carried in the DCI; or determining the closed loop power control index of the TPC command in the DCI according to the grouped DCI type of the DCI, related information of the DCI and a first association relationship, wherein the first association relationship is an association relationship between the related information of the DCI and the closed loop power control index.

5. The method according to claim 1, wherein determining the closed loop power control index of the TPC command in the DCI comprises:
   acquiring an offset of the grouped DCI type; and
   determining a starting position of the TPC command in the grouped DCI type according to the offset of the grouped DCI type.

6. The method according to claim 3, wherein the related information of the DCI comprises at least one of:
   frequency domain position information of the DCI;
   time domain position information of the DCI;
   code domain position information of the DCI;
   demodulation reference signal (DMRS) format information of the DCI;
   format identifier information of the DCI;
   grant type information of DCI-related transmission;
   service type information of the DCI-related transmission; or
   scrambling information of the DCI.

7. A power control method, applied to a second communication node, comprising:
   presetting at least one grouped downlink control information (DCI) type for a first communication node, wherein the grouped DCI type is used for determining a transmission manner of sending a transmit power control (TPC) command in a grouping manner; and
   sending DCI to the first communication node according to the grouped DCI type, wherein the DCI carries the TPC command, wherein the TPC command is used for determining a closed loop power control part to be updated in transmit power of the first communication node;
   wherein the method further comprises:
   configuring a detection manner of the grouped DCI type for the first communication node, wherein the grouped DCI type is determined through the detection manner according to first detection information;
   configuring first channel information for the first communication node, wherein the first channel information comprises at least one of: configured or activated carrier information; configured or activated serving cell information; or configured or activated bandwidth part information; and
   configuring a quantity of closed loop power controls or a closed loop power control index of the first channel information for the first communication node by at least one of the following manners:
   configuring a quantity of closed loop power controls of the carrier information or a closed loop power control index of the carrier information;
   configuring a quantity of closed loop power controls of the serving cell information or a closed loop power control index of the serving cell information; or
   configuring a quantity of closed loop power controls of the bandwidth part information or a closed loop power control index of the bandwidth part information.

8. The method according to claim 7, before sending the DCI to the first communication node according to the grouped DCI type, further comprising: configuring or predefining first closed loop power control index related information for each of the grouped DCI types, wherein the first closed loop power control index related information is used for determining a closed loop power control associated with the TPC command;
   wherein sending the DCI to the first communication node according to the grouped DCI type comprises: sending the DCI to the first communication node according to the grouped DCI type and the first closed loop power control index related information,
   wherein the first closed loop power control index related information comprises at least one of: a specified closed loop power control index, or a specified quantity of closed loop power control indexes.

9. The method according to claim 8, wherein the specified closed loop power control index is specified by at least one of: specifying all closed loop power control indexes, or specifying part of closed loop power control indexes,
   wherein the specified part of closed loop power control indexes comprises at least one of:
   a closed loop power control index, a closed loop power control index group number, or second closed loop power control index related information;
   wherein the second closed loop power control index related information comprises at least one of: grant type information, or service type information.

10. The method according to claim 7, wherein the first detection information comprises at least one of:
    a DCI format identification information domain;
    a DCI format type index;
    reference signal configuration information of the DCI;
    time domain information of the DCI;
    frequency domain information of the DCI; or
    code domain information of the DCI.

11. A first communication node, comprising a processor, wherein the processor is configured to execute a program to implement the following:
    receiving downlink control information (DCI), wherein the DCI carries a transmit power control (TPC) command;
    determining a closed loop power control index of the TPC command in the DCI; and
    updating a closed loop power control part corresponding to the closed loop power control index in transmit power of the first communication node according to the TPC command;
    wherein before determining the closed loop power control index of the TPC command in the DCI, the method further comprises:
    determining a grouped DCI type of the DCI according to a preset grouped DCI type detection manner;
    wherein determining the closed loop power control index of the TPC command in the DCI comprises:
    acquiring first closed loop power control index related information of the grouped DCI type;
    acquiring first channel information and at least one of a quantity of closed loop power controls of each channel in the first channel information, or a closed loop power control index of each channel in the first channel information; and
    determining a number of TPC commands in the grouped DCI type according to the first closed loop power control index related information and the at least one of the quantity of closed loop power controls of each channel in the first channel information or the closed loop power control index of each channel in the first channel information;

wherein the first channel information comprises at least one of: configured or activated carrier information, configured or activated serving cell information, or configured or activated bandwidth part information; and the first closed loop power control index related information comprises at least one of: a specified closed loop power control index, or a specified quantity of closed loop power control indexes;

wherein the program is capable of maintaining the normal communication of a client.

* * * * *